United States Patent [19]
Turner et al.

[11] Patent Number: 6,095,541
[45] Date of Patent: Aug. 1, 2000

[54] ADJUSTABLE GAS SPRING SUSPENSION SYSTEM

[75] Inventors: Paul H. Turner, Boulder, Colo.;
Michael L. McAndrews, Santa Cruz;
Ricardo R. Baldomero, Felton, both of Calif.

[73] Assignee: RockShox, Inc., San Jose, Calif.

[21] Appl. No.: 09/018,407

[22] Filed: Feb. 4, 1998

Related U.S. Application Data

[60] Provisional application No. 60/052,707, Jul. 16, 1997.

[51] Int. Cl.⁷ ..................................................... B62K 21/20
[52] U.S. Cl. ....................... 280/276; 267/64.26; 267/226; 267/175; 188/322.22
[58] Field of Search ...................................... 280/283, 276, 280/277; 267/64.26, 64.11, 73, 74, 221, 226, 175, 177, 140.2; 188/322.22

[56] References Cited

U.S. PATENT DOCUMENTS

| | | | |
|---|---|---|---|
| 3,687,438 | 8/1972 | Rickard | 267/64.26 |
| 4,360,192 | 11/1982 | Ishida | 267/64.28 |
| 4,971,344 | 11/1990 | Turner | 280/276 |
| 5,000,470 | 3/1991 | Kamler et al. | |
| 5,088,705 | 2/1992 | Tsai . | |
| 5,102,109 | 4/1992 | Schnetz | 267/226 |
| 5,284,352 | 2/1994 | Chen . | |
| 5,380,026 | 1/1995 | Robinson | 280/276 |
| 5,509,674 | 4/1996 | Browning . | |
| 5,509,675 | 4/1996 | Barnett . | |
| 5,538,276 | 7/1996 | Tullis . | |
| 5,725,226 | 3/1998 | Cabrerizo-Pariente . | |
| 5,775,677 | 7/1998 | Englund | 267/64.11 |

*Primary Examiner*—Anne Marie Boehler
*Assistant Examiner*—Avraham H. Lerner
*Attorney, Agent, or Firm*—Skadden Arps Slate Meagher & Flom LLP; David W. Hansen

[57] ABSTRACT

A suspension system for a bicycle or other vehicle or apparatus, the system including at least one telescoping strut comprising a first telescoping member and a second telescoping member, the first and second telescoping members being telescopingly and coaxially engaged with each other so that the strut is compressible by relative movement of the telescoping members toward each other and expandable by relative movement of the telescoping members away from each other. A piston may be interconnected with the second telescoping member and slidably positioned within the first telescoping member. The piston separates a primary compression spring chamber into two gas chambers connected by an adjustable port, whereby compression or expansion of the strut creates a damping force that resists such relative movement of the telescoping members, resulting in the primary compression spring having a frequency-sensitive spring rate. The crack force, spring rate and other characteristics of the suspension system may be adjusted using a piston location adjuster to adjust the piston height, and/or a negative preload spring to apply a compressive preload force to the telescoping strut.

8 Claims, 3 Drawing Sheets

ADJUSTABLE GAS SPRING SUSPENSION SYSTEM

CROSS-REFERENCE TO RELATED PROVISIONAL APPLICATION

The present application claims the benefit of the earlier filing date of copending U.S. Provisional Patent Application Ser. No. 60/052,707, filed Jul. 16, 1997.

FIELD OF THE INVENTION

This invention relates to the design and construction of suspension systems. More particularly, the present invention relates to a fully adjustable gas spring suspension system comprising a frequency-sensitive spring rate adjuster, a gas piston location adjuster, and a negative spring preload adjuster, which may be used in combination with a hydraulic damping mechanism. Still more particularly, the present invention relates to such a suspension system for use in a two-wheeled vehicle such as a bicycle.

BACKGROUND OF THE INVENTION

In the past, suspension systems in general have been used for many applications, including cushioning impacts, vibrations or other disturbances experienced by vehicles and machinery. Typical applications, for example, include the use of suspension systems in bicycles and motorcycles.

For example, bicycles have been developed with suspension systems for cushioning impacts or vibrations experienced by the rider when the bicycle contacts bumps, ruts, rocks, pot holes or other obstacles and road variations. Typically, such bicycle suspension systems have been configured for use in the front or rear bicycle fork, in the head tube that connects the front fork to the bicycle frame and handlebars, in the seat post, and in conjunction with a rear wheel swing-arm assembly, among other locations.

It has become increasingly popular to locate bicycle suspension systems within bicycle forks. Bicycle suspension forks comprise at least one fork leg or strut, and usually comprise two such struts, each strut including inner and outer telescoping fork members or tubes. Bicycle fork suspension systems have often included spring devices such as coil springs, elastomer springs, arcuate spring discs, leaf springs, gas springs such as air springs, among other types of springs used for nominally biasing the fork tubes apart from one another and for absorbing compression forces applied to the forks as a result of impacts and vibrations experienced during operation of the bicycle. Using spring devices in this way permits the fork members to compress in response to an impact or other force input, and expand or rebound once the force is removed, so that the inner and outer fork members or tubes return to their original spaced apart positions relative to each other. Such bicycle suspension systems have also included spring devices in combination with damping devices such as hydraulic damping or friction damping mechanisms, which absorb some of the energy imparted to the bicycle by impacts or other force inputs causing compression or rebound of the fork members, thereby resisting movement of the fork members relative to each other.

One problem associated with prior suspension systems, and particularly with vehicle suspension systems such as those incorporated into bicycle suspension forks, is that they have been unnecessarily heavy. For example, the weight of a bicycle fork affects the handling of the bicycle, and adds to the overall weight of the bicycle, which the rider must work to propel and control. Reducing weight is therefore of great concern to all bicycle riders, and particularly to those involved in racing applications, where a reduction in weight offers an important competitive advantage. Accordingly, there is a need for a suspension system, and particularly for a bicycle suspension fork, that is designed to be lightweight.

In the past, weight savings have been achieved in suspension systems such as bicycle suspension forks by using a gas spring as the spring device, instead of heavier spring devices such as metal coil springs and the like. The resulting gas-sprung designs have suffered from disadvantages, however, including limited tunability and, therefore, an inability to accommodate a wide variety of rider preferences. Consequently, there is a need for a gas-sprung suspension device, and particularly a gas-sprung bicycle suspension fork, that is designed to be fully tunable.

One adjustment feature that has been incorporated into gas-sprung suspension systems such as suspension forks is the ability to increase or decrease the gas pressure in the suspension system. In bicycle suspension forks as in other suspension systems, one problem associated with this adjustment feature is that an increase or decrease in the fork gas pressure results in a corresponding increase or decrease in the spring force, and, accordingly, in the compressive force required to be applied to the fork before the inner and outer fork tubes will begin to compress in response to a bump or other force input (this force is commonly known as the "crack force"). Thus, depending upon the gas pressure in the gas spring, the suspension system may be undesirably stiff, and adequately responsive only to large inputs.

In gas-sprung bicycle suspension forks, for example, if the crack force is too large for a given rider, the fork will act much like a rigid, unsuspended fork in response to relatively small force inputs. If the crack force is too small, the fork tubes will compress easily and may sag extensively in response to the rider's weight, thus reducing their available compressive travel during use. Neither condition is desirable, and the wide range of potential rider weights and preferences makes the use of a pre-set or inadequately adjustable crack force problematic. Thus, there is a need for a gas-sprung suspension system, and particularly for a gas-sprung suspension bicycle fork, that is designed to have an improved adjustment feature for adjusting the crack force of the fork.

In gas-sprung suspensions, compression of the telescoping members of the suspension system compresses the gas. Due to the nonlinear spring rate of gases ("spring rate" may be defined as the amount of force required to compress or expand the suspension system a given distance) the spring force generated by the gas chamber will increase dramatically toward the end of the telescoping members' travel. Delaying the onset of this ramp-up in gas spring force will result in a softer suspension, whereas hastening the onset of the force ramp-up will result in a stiffer suspension. To accommodate a variety of weights to be suspended, and, where vehicles such as bicycles are concerned, to accommodate a broad range of user preferences, it is desirable to be able to adjust the spring force ramp-up location. Thus, there is a need for a gas-sprung suspension system, and particularly for a gas-sprung suspension bicycle fork, that is designed to have an improved adjustment feature for adjusting the onset of the ramp-up in spring force during compression of the suspension system.

In addition, previous suspension system designs, and bicycle suspension fork designs in particular, typically have been limited to a single spring rate during both the low and high velocity compression or rebound regimes of the suspension system. This is true for gas-sprung suspension systems as well as for suspension systems using spring devices other than gas. Generally, a lesser spring rate is desirable for small bumps and other low-velocity inputs in order to achieve a supple suspension, whereas a relatively greater spring rate is desirable for high-velocity inputs in order to avoid over-reactive responses by the suspension system.

This principle can be readily seen in bicycle applications, where a lesser spring rate results in a more comfortable ride over small bumps and the like, and a relatively greater spring rate provides greater control in response to large bumps and sudden impacts. Thus, there is a need for a suspension system, and particularly for a bicycle suspension system, having a spring rate that varies based upon the speed or frequency of the compression or rebound of the suspension system.

As previously indicated, in many applications, and particularly in bicycling and bicycle racing applications, the desirability of being able to adjust the performance characteristics of the suspension system is significant. Accordingly, there is a need for a suspension system, and particularly for a bicycle suspension system, in which the spring rate is frequency-sensitive, and in which such speed-sensitivity of the spring rate is adjustable.

In addition, it is desirable to have a suspension system comprising each of the previously described features, resulting in a suspension system that is suited for suspension applications in general, and particularly for bicycle suspension applications, and that is active and tunable for a wide variety of riding preferences.

In order to provide greater control of the compression and/or rebound characteristics of the suspension system, it is also desirable for a suspension system to have each of the previously described features in combination with hydraulic damping.

Accordingly, one object of the present invention is to provide a suspension system, and particularly a bicycle suspension fork, that is designed to be lightweight.

Another object is to provide a gas-sprung suspension device, and particularly a gas-sprung bicycle suspension fork, that is designed to be fully tunable.

A further object of the invention is to provide a gas-sprung suspension system, and particularly a gas-sprung suspension bicycle fork, that is designed to have an improved adjustment feature for adjusting the crack force of the fork.

Yet another object is to provide a gas-sprung suspension system, and particularly a gas-sprung suspension bicycle fork, that is designed to have an improved adjustment feature for adjusting the onset of the ramp-up in spring force during compression of the suspension system.

Still a further object of the invention is to provide a suspension system, and particularly a bicycle suspension system, having a spring rate that varies based upon the speed or frequency of the compression or rebound of the suspension system.

Another object is to provide a suspension system, and particularly a bicycle suspension system, in which the spring rate is frequency-sensitive, and in which such speed-sensitivity of the spring rate is adjustable.

Yet another object is to provide a lightweight, fully tunable suspension system having an improved adjustment feature for adjusting the crack force of the fork, an improved adjustment feature for adjusting the onset of the ramp-up in spring force during compression of the suspension system, and a spring rate that varies based upon the speed or frequency of the compression or rebound of the suspension system, the speed-sensitivity of which can be adjusted, resulting in a suspension system that is suited for suspension applications in general, and particularly for bicycle suspension applications, and that is active and tunable for a wide variety of riding preferences.

SUMMARY OF THE INVENTION

The present invention is directed to a suspension system for providing shock absorption to a machine or vehicle such as, for example, a bicycle. A suspension system of the type included within the present invention, for example, includes at least one telescoping strut (but will usually include two such struts when used in a bicycle fork) comprising a first telescoping member and a second telescoping member, the first and second members being telescopingly and coaxially engaged with each other so that the strut is compressible by relative movement of the telescoping members toward each other and expandable by relative movement of the telescoping members away from each other. The bicycle or other suspension system may include a piston interconnected with the second telescoping member and slidably positioned within the first telescoping member. A spring element such as a gas chamber containing a gas is positioned within the first telescoping member between the piston and the first end of the first telescoping member, forming a primary spring chamber.

Preferably, the piston separates the primary spring chamber into two gas chambers connected by at least one port, although a single spring chamber may be used. When two gas chambers are used, compression or expansion of the strut causes a flow of gas between the two gas chambers and creates a damping force that resists relative movement of the telescoping members, resulting in the primary compression spring having a frequency-sensitive spring rate. The port may be configured to be adjustable, enabling a user to adjust the frequency-sensitive spring rate that results.

The second gas chamber may be formed within the hollow piston rod to which the piston is attached. This, in combination with a bolt, Schrader valve or other fastener or port closure externally positioned through the bottom end of the second telescoping member in a manner known in the art, comprises a safety mechanism for preventing hazardous decompression of the first and second gas chambers during disassembly or assembly of the suspension system.

In a preferred embodiment of the present invention, the characteristics of the suspension system may be adjusted in several ways. For example, a gas piston location adjuster may be provided for adjusting the piston position, thereby permitting a change in the characteristics of the primary spring, i.e., an increase or decrease in the spring rate. The suspension system may also include a negative preload spring, which is positioned between the first and second telescoping members, to apply a compressive preload force to the telescoping strut, thereby enabling a reduction of the crack force of the suspension system. This negative preload spring may be, for example, a coil spring or gas spring. Where a coil, elastomer or other non-gas spring is used, the spring preload may be adjusted using a negative preload spring preload adjuster or by exchanging the negative preload spring with another spring having a stiffer or softer spring rate.

Where a negative gas spring is used, the spring rate of the suspension system may be altered by pressurizing or depressurizing the primary or negative springs using Schrader valves or other mechanisms externally positioned in connection with those springs. In addition, the suspension system may include an incompressible fluid damping mechanism, which may comprise a cartridge-type damper or other damping mechanism known in the art, for creating a second damping force to resist compression and/or expansion of the strut.

The present invention may be used in any type of suspension system, although it is ideal for use in a lightweight bicycle suspension system such as a front or rear bicycle suspension fork. A bicycle suspension fork includes a steerer tube connected to at least one, and usually two, telescoping struts. The struts may be curved at their upper ends to meet the steerer tube, or they may be straight and be connected to the steerer tube by means of one or more fork crowns. Typically, the two struts of a bicycle suspension fork are connected by a fork cross member that may be used to provide structural stability to the system, to hold a brake cable in position relative to the fork, or to achieve other objectives. The two struts also each have dropouts at their lower ends for connecting to a bicycle wheel.

Still other objects and advantages of the present invention will become readily apparent to those skilled in this art from the following detailed description, wherein only the preferred embodiment of the invention are described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
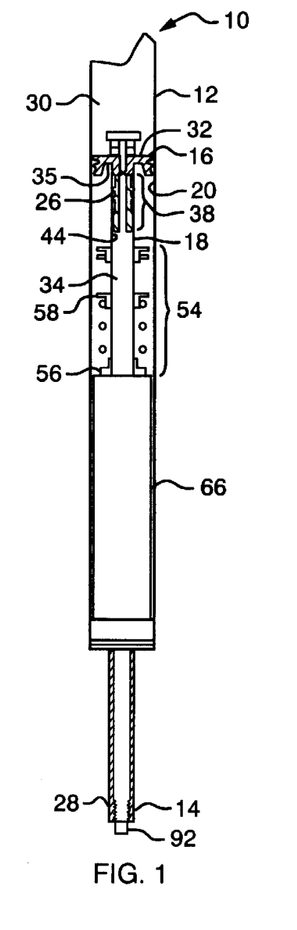
FIG. 1 is a partial sectional view of an embodiment of the suspension system of the present invention, with the negative spring adjustment surface of one embodiment of the negative spring preload adjuster of the present invention shown in two of several alternative seating positions along the piston rod.
Figures 3, 4, 5:
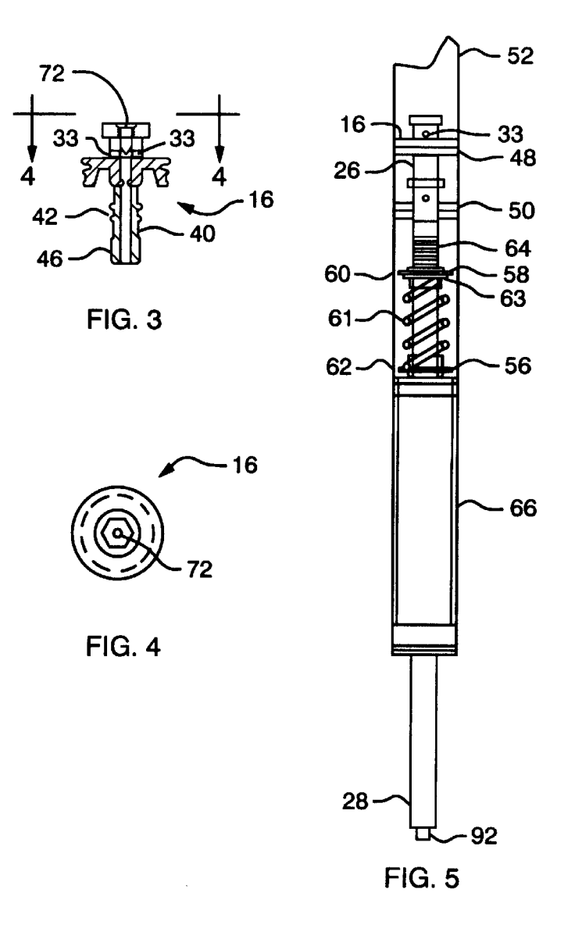
FIG. 3 is a sectional view of the gas piston of the suspension system of the present invention.
FIG. 4 is a partial sectional top view of the gas piston of the suspension system of the present invention taken along lines 4—4 of FIG. 3.
FIG. 5 is a partial sectional view of an embodiment of the suspension system of the present invention, with the gas piston shown in two of several alternative positions along the piston rod.

Referring to FIG. 1, a preferred embodiment of the present suspension system 10 is shown, in which suspension system 10 includes a telescoping strut comprised of a first telescoping member 12 and a second telescoping member 14 that are telescopingly and coaxially engaged with each other. A gas piston 16, as shown in greater detail in FIGS. 3 and 4, is attached to a piston rod 18, which serves as the second telescoping member 14. Gas piston 16 is further in slidable, sealed engagement with an inner surface 20 of first telescoping member 12. As will be apparent to those skilled in the art, gas piston 16 also may be attached to first telescoping member 12 and be in slidable, sealed engagement with piston rod 18.

Figure 8:
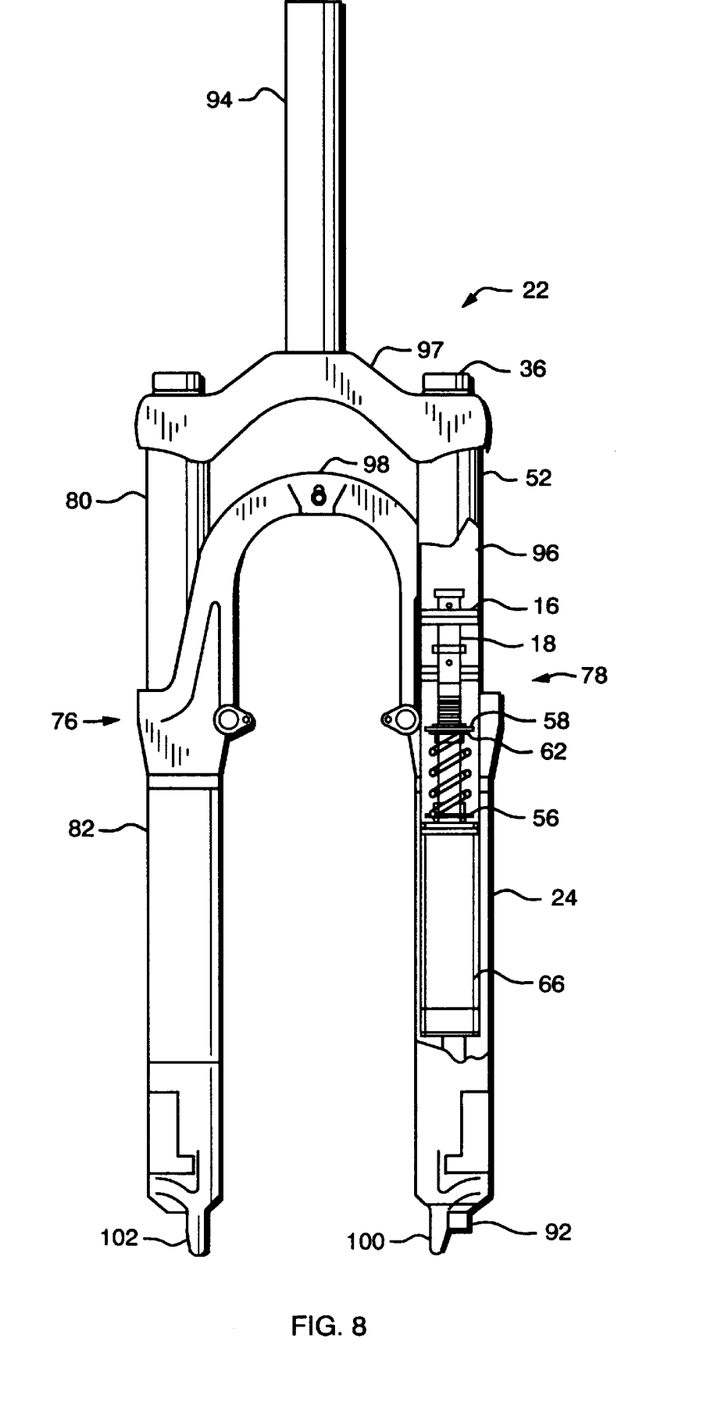
FIG. 8 is a partial sectional view of a bicycle suspension fork incorporating an embodiment of the suspension system of the present invention, and with the gas piston shown in two of several alternative positions along the piston rod.

Although suspension system 10 may be utilized in a wide variety of devices, machines and vehicles, FIG. 8 illustrates an exemplary use of the present invention in a bicycle suspension fork 22. In the embodiment of FIG. 8, gas piston 16 is attached to piston rod 18 which is connected to an outer fork tube 24 that serves as the second telescoping member.

As illustrated in FIG. 1, piston rod 18 comprises a hollow tube, and has a first end 26 (upper end in FIG. 1) and a second end 28 (lower end in FIG. 1). A first gas chamber 30 is located within first telescoping member 12 on a first side 32 (top side in FIG. 1) of piston 16. A second gas chamber 34 is located within hollow piston rod 18 on a second side 35 (lower side in FIG. 1) of piston 16. At least one port 33 must be provided to permit flow through or around gas piston 16, in order to provide a frequency-sensitive spring rate, as discussed in further detail below. As shown in the embodiment of FIGS. 3 and 5, gas piston 16 has a plurality of ports 33 operating to connect first gas chamber 30 with second gas chamber 34.

Preferably, the gas used in first and second gas chambers 30, 34 of this embodiment is air. First and second air chambers 30, 34 comprise an air spring having a spring rate. The spring rate of the air spring may be adjusted by increasing the air pressure in first and second chambers 30, 34 using a port (not shown) extending into either first air chamber 30 or second air chamber 34. In the embodiment described in FIG. 8, for example, such a port (not shown) is located under a removable top cap 36 and extends into first air chamber 30. In the embodiment of bicycle suspension fork 22 described in FIG. 8, the fork air spring pressure preferably may be adjusted up to about 80 psi.

Typically, an air spring has a nonlinearly progressive spring rate, i.e., the amount of force required to compress the spring increases non-linearly as the spring is compressed. As a result, at some point during the compression of the spring, a significant "ramp-up" in spring force occurs, such that, compared to the forces required when the spring first began to be compressed, significantly greater forces must be applied to compress the spring. Thus, the embodiments described in FIGS. 1, 3, 5 and 8 include yet another device—a piston adjustment mechanism comprising a gas piston location adjuster 38—by which to adjust the spring rate of the air spring, and in particular, to make the spring rate less or more progressive by delaying or hastening the onset of the ramp-up in air spring force as the air spring compresses. Specifically, gas piston 16 has a cylindrical portion 40 on second side 35 of gas piston 16. Cylindrical portion 40 provides an O-ring groove 42 for seating an O-ring (not shown) to seal against inner surface 44 of piston rod 18, and a thread 46 to interconnect with threads on inner surface 44 of piston rod 18, to both sealingly connect piston 16 to piston rod 18 and to permit the location of piston 16 relative to piston rod 18 to be adjusted. FIG. 5 illustrates the movement of gas piston 16 from a first position 48 relative to piston rod 18, to a second position 50.

Figure 7:
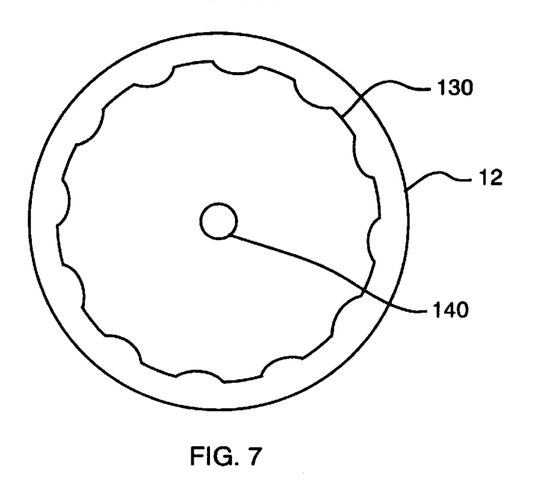
FIG. 7 is a top elevational view of the gas piston location adjuster of the present invention taken along lines 7—7 of FIG. 6.

An adjustment of gas piston 16 toward second end 28 of piston rod 18 will result in a softer suspension, whereas an adjustment of gas piston 16 away from second end 28 of piston rod 18 and toward a first end 52 of first telescoping member 12 will result in a stiffer, more progressive suspension. In the embodiment of FIG. 7, for example, the result is the ability to simply adjust the progressivity of the spring rate to accommodate a variety of user preferences.

Figure 6:
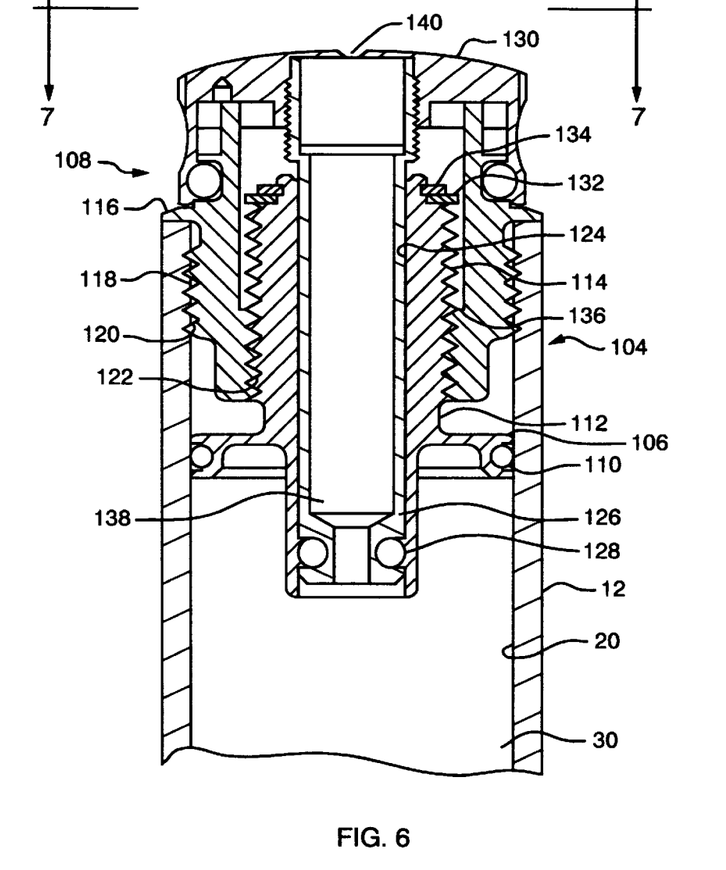
FIG. 6 is a sectional view of an alternative embodiment of the gas piston location adjuster of the present invention.

An alternative embodiment of the piston adjustment mechanism of FIGS. 1, 3, 5 and 8 is shown in FIGS. 6 and 7, which illustrate a gas piston location adjuster 104. Gas piston location adjuster 104 comprises gas piston 106 and top cap assembly 108. As with gas piston 16 in FIG. 5, gas piston 106 is in slidable engagement with inner surface 20 of first telescoping member 12, and is sealed against inner surface 20 by an o-ring 110. Gas piston 106 has an interface portion 112, which is preferably formed integrally with gas piston 106. Interface portion 112 is annular, and preferably has a hexagonally-shaped inner surface 124 that communicates with an adjuster rod 126. Adjuster rod 126 slidably and axially extends into interface portion 112 and is sealed therewith by an o-ring 128.

Top cap assembly 108 comprises an adjuster body 116 and an adjuster knob 130 rotatably movable with respect to adjuster body 116. Adjuster knob 130 is interconnected about its axis of rotation with an adjuster rod 126, such that rotation of adjuster knob 130 effects rotation of adjuster rod 126. Interface portion 112 of gas piston 106 has a series of external threads 114 configured for threaded connection with adjuster body 116. Adjuster body 116 is annular, having external threads 118 which cooperate with a series of threads 120 formed on inner surface 20 of first telescoping member 12 to close first end 52 of first telescoping member 12 and attach gas piston location adjuster 104 thereto. Adjuster body 116 also has internal threads 122 which cooperated with external threads 114 of interface portion 112 of gas piston 106.

In operation, when adjuster knob 130 is turned one direction, adjuster rod 126 and gas piston 106 turn with adjuster knob 130, and the connection between external threads 114 of interface portion 112 and internal threads 122 of adjuster body 116 forces interface portion 112 and gas piston 106 in a direction away from adjuster knob 130 and further into first telescoping member 12. Such movement increases the spring rate of the air spring, thus hastening the onset of the ramp-up in spring force and resulting in a stiffer, more progressive suspension. When adjuster knob 130 is turned in the other direction, the opposite result is effected.

A washer 132 may be connected to interface portion 112 by a snap ring 134, as shown in FIG. 6, so that when interface portion 112 and gas piston 106 move further into first telescoping member 12, washer 132 may eventually contact shoulder 136 formed on adjuster body 116, thereby preventing further movement of gas piston 106 in that direction. In addition, in the embodiment of FIGS. 6 and 7, adjuster rod 126 provides a passage 138 so that gas may be inserted or removed from first air chamber 30 by way of a Schrader or other type of gas valve 140, such as of the type that is conventionally used to pressurize gas-filled footballs.

Suspension system 10 of the present invention also provides a device designed to permit greater adjustment of the system's crack force. This device is a negative spring preload adjuster 54, which preferably comprises a first spring bearing surface 56, which in the embodiment of FIG. 1 is an annular flange or collar, and a negative spring adjustment surface comprising a second spring bearing surface 58 that preferably abuts a removable fastener. In the embodiment of FIG. 1, second spring bearing surface 58 is an annular flange or collar similar to that of first spring bearing surface 56. As can be seen in the embodiments of the present invention illustrated in FIGS. 1, 5 and 8, first spring bearing surface 56 is connected to first telescoping member 12 and is positioned between first and second ends 26, 28 of piston rod 18. In these embodiments, a first end 60 of a spring 61 engages first spring bearing surface 56, and a second end 62 of spring 61 engages second spring bearing surface 58, which is located between spring 61 and first end 26 of piston rod 18.

When positioned to force first and second spring bearing surfaces 56, 58 apart, spring 61 acts as a negative preload spring pulling first and second telescoping members 12, 14 together and counteracting the force of the air spring, which acts to separate first and second telescoping members 12, 14. In addition, in this embodiment, second spring bearing surface 58 of the negative spring surface is removably securable at one or more locations along piston rod 18, as illustrated in FIG. 1, so that the nominal compression of negative preload spring 61 (i.e., the compression of negative preload spring 61 when first and second telescoping members 12, 14 are in their neutral, spaced-apart, but uncompressed state) may be varied, thereby varying the crack force of suspension system 10. Advantageously, negative spring 61 may also serve the function of a top-out spring, i.e., preventing a collision between the first and second telescoping members during rebound of suspension system 10. Although various types of springs have been used to cushion top-out impacts in the past, gas springs have not been used or recognized as being usable as top-out bumpers. As recognized by the present invention, however, the progressive spring rates and other features of gas springs give them a unique potential of providing a gradual, readily tunable resistance to top-out impacts.

Spring 61 could be comprised of any type of spring material, such as a coil spring, an elastomeric member, an air spring, arcuate spring discs or other known springs or combinations of springs. In the embodiments disclosed in FIGS. 1, 5 and 8, spring 61 is a coil spring, and the removable fastener of the spring adjustment surface comprises a spring clip or "C-Clip" 63 made to engage with any of four spring clip grooves 64 formed on piston rod 18. In addition, as is preferred, the piston rod flange that acts as first spring bearing surface 56 abuts a hydraulic damping mechanism comprising a hydraulic damper cartridge 66 which is secured to first telescoping member 12, and which will be described in more detail below. By adjusting the location of spring clip 63, the compression of negative spring 61 and, as a result, the crack force of the primary gas spring, is adjusted.

For example, in the alternative embodiment of a bicycle suspension fork, as shown in FIG. 8, bicycle riders having relatively light body weights may want a more plush ride, which may be achieved by moving second spring bearing surface 58 toward second end 28 (as can be seen in FIG. 1) of piston rod 18 to increase the force pulling first and second telescoping members 12, 14 together, thereby decreasing the crack force of the gas spring. Conversely, heavier riders may want a stiffer suspension, which may be achieved by moving second spring bearing surface 58 toward first end 26 of piston rod 18 to decrease the force biasing first and second telescoping members 12, 14 together, thereby increasing the crack force of the gas spring. Of course, negative spring 61 may be exchanged for a stiffer or softer spring, or may be removed altogether, to further vary the stiffness of suspension system 10.

Figure 2:
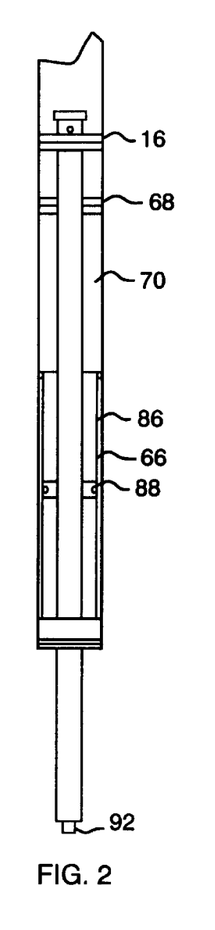
FIG. 2 is a partial sectional view of an alternative embodiment of the suspension system of the present invention.

A further alternative embodiment for negative spring preload adjuster 54 is provided in FIG. 2. This figure illustrates a suspension system like that illustrated in FIG. 1, except that negative spring preload adjuster 54 comprises a negative spring piston 68 fixed to piston rod 18 to sealingly contain a compressed gas volume, preferably air, in a negative spring chamber 70 defined by inner surface 20 of first telescoping member 12 and negative spring piston 68. As will be appreciated by those having skill in the art, gas piston 16 may also serve as the negative spring piston 68. The air pressure in negative spring chamber 70 is preferably adjustable and may be increased or decreased by inserting air into, or releasing air from, negative spring chamber 70 by means of a Schrader or other valve known in the art. For example, although not shown in FIG. 2, such a Schrader valve may be positioned through second end 28 of piston rod 18 in this embodiment.

Turning to FIG. 3, a port adjustment mechanism comprising a set screw or other type of needle valve 72 is threaded into first side 32 of piston 16 and may be adjusted to variably restrict the air flow from first air chamber 30 to second air chamber 34. This arrangement comprises a frequency-sensitive spring rate adjuster providing an adjustable, frequency-sensitive spring rate. Specifically, by turning needle valve 72 such that ports 33 are substantially unobstructed, the damping created will be reduced, and first and second air chambers 30, 34 will act as a single air spring, resulting in an increased spring rate and a generally increased responsiveness of the suspension system to force inputs. The advantage of this dual-chamber system is significant. When used in bicycle suspension fork 22 of FIG. 8, for example, the dual-chamber air spring enables the suspension system to be generally more responsive to force inputs, thereby providing the rider with a more supple ride. Conversely, by adjusting needle valve 72 so that ports 33 are partially obstructed, air flow is more restricted and speed-sensitive damping (during both compression and rebound) will occur, resulting in a progressively increasing spring rate as the air flow speed increases. The suspension system will therefore be progressively more rigid, yielding a stiffer ride. If needle valve 72 is adjusted further so that the air flow is highly restricted or totally choked-off, second chamber 34 may be substantially or totally prevented from acting as a spring, so that the air spring of the suspension system will comprise only first chamber 30. In the preferred embodiment of the present invention, second air chamber 34 comprises approximately 300 of the total air spring volume.

As will be apparent to those skilled in the art, separate flow paths through or around piston 16 may be used for enabling communication of first and second gas chambers 30, 34 during compression and rebound. As a result, different compressive and rebound damping characteristics may be achieved by providing, for example, differently sized and/or adjustable piston ports, for the respective compression and rebound flow paths. For example, two one-way valves having different cross-sectional areas may be used, one to permit flow across gas piston 16 during compression of first and second telescoping members 12, 14, and the other to permit flow across gas piston 16 during rebound. In other embodiments, such one-way valves could be adjustable needle valves, reed valves or other valves known in the art.

The frequency-sensitive air spring of the preferred embodiment of the present invention is not adjustable externally from first telescoping member 12. In FIG. 8, for example, needle valve 72 may be accessed and adjusted by removing a top cap 36 located at first end 52 of first telescoping member 12 (the inner fork tube). However, although it would add weight to the spring rate adjustment and gas damping mechanism of the preferred embodiment of the present invention, this mechanism may be made externally adjustable by use of Schrader or other valves in a manner known in the art. In addition, it will also be appreciated that although the preferred embodiment of the present invention utilizes air as the spring and to provide a frequency-sensitive spring rate, other gases such as nitrogen that are appropriate for this purpose may be used.

As can be seen, suspension system 10 of the present invention provides a lightweight, fully tunable gas spring suspension system including a gas piston location adjuster 38, a negative spring preload adjuster 54 and an adjustable frequency-sensitive spring rate adjuster. It will be appreciated, however, that although suspension system 10 is preferably comprised of all of these devices, it may be comprised of any combination of these devices, or of any one of these devices alone.

Suspension system 10 of the present invention may be used in any type of machine or vehicle, although it is particularly suited for use in a lightweight bicycle suspension system such as a front or rear bicycle suspension fork. As illustrated in FIG. 8, a front bicycle suspension fork 22 includes a steerer tube 94 (which connects a bicycle frame (not shown) to bicycle suspension fork 22) connected to at least one, and usually two, telescoping struts 76, 78. Struts 76, 78 may be curved at their upper ends to meet steerer tube 94, or they may be straight as in FIG. 8 and be connected to steerer tube 94 by means of one or more fork crowns 97. Struts 76, 78 preferably also are connected by a fork cross member 98 that may be used to provide structural stability to suspension fork 22, to hold a brake cable in position relative to fork 22, or to achieve other objectives. Struts 76, 78 also have dropouts 100, 102 for connecting a bicycle (not shown) to a bicycle wheel (not shown).

In the embodiment of FIG. 8, although aspects of the present invention are illustrated in only one of bicycle fork struts 76, 78, it is intended that any or all of the features of the present invention may be used in one or both of the struts of a bicycle fork. Further, the features of the present invention may be disposed in either of inner or outer telescoping tubes 80, 82 of FIG. 8, and, as is known in the art, the inner fork tubes 80 may comprise the lower tubes of the fork and the outer fork tubes 82 may comprise the upper tubes of the fork.

One or more of the features of the lightweight, fully adjustable suspension system of the present invention may also be used in conjunction with incompressible fluid damping. For example, as shown in FIGS. 1, 2, 5 and 8, a hydraulic damper cartridge 66 may be used, and is preferable to provide high-speed damping (e.g., where the first and second telescoping members are compressed or expanded at high speeds). Preferably, damper cartridge 66 is comprised of a sealed cylindrical member 86 connected to, integral with, or constituted of first telescoping member 80, and having hydraulic fluid therein. In the preferred embodiment of the present invention, a common grade of hydraulic fluid preferably having approximately SAE weight 5 is used for damping fluid. However, it will be appreciated that a variety of fluids such as fish oil, glycerine or water, or a combination thereof, may be used instead. Also preferably, cartridge 66 contains a piston 88 (as shown in FIG. 2) that divides cylindrical member 86 into two hydraulic fluid chambers. Piston 88 is fixed to piston rod 90, and a valve or valves (not shown) is included in piston 88 and/or piston rod 18 so that when the first telescoping member is compressed or expanded relative to second telescoping member 82, hydraulic fluid flows through the valve, resulting in damping of the movement of the suspension system.

The preferred cartridge for use as discussed herein is the "C-3" cartridge made by RockShox, Inc. of San Jose, Calif. The cartridge may be exchanged (or the valving or fluid in the cartridge may be changed) with cartridges having different damping characteristics to achieve different fork damping rates. For fine-tuning the damping provided by such a cartridge, the damping valves may be internally or externally adjustable in a known manner.

In connection with the bicycle suspension fork embodiment of FIG. 8, hollow piston rod 18 serves a purpose in addition to those previously described. Specifically, a bolt 92 is threaded into hollow piston rod 18 through second telescoping member 82 (the lower fork tube). When it is desirable to remove damper cartridge 66 for replacement or servicing, bolt 92 is unscrewed. Because piston rod 18 is hollow throughout its length, the air pressure in first air chamber 96 and second air chamber (not shown) inside piston rod 18 may be gradually released as bolt 92 is unscrewed. This avoids the possibility of hazardous decompression of the air pressure that may result when the fork is otherwise disassembled.

While there are shown and described herein certain specific structures comprising aspects of the invention, it will be clear to those skilled in the art that various modifications and rearrangements of the parts may be made without departing from the spirit and scope of the underlying inventive concept, and that the same is not limited to the particular forms herein shown and described.

What is claimed is:

1. A suspension system, comprising:
   a telescoping strut comprising a first telescoping member and a second telescoping member, said first and second telescoping members being telescopingly and coaxially engaged with each other, said telescoping strut being compressible by relative movement of said first and second telescoping members toward each other, and being expandable by relative movement of said first and second telescoping members away from each other;
   a positive splint positioned between said first and second telescoping members, whereby an expansive force may be applied to said telescoping strut;
   a negative preload spring positioned between said first and second telescoping members, whereby a compressive force opposing said expansive force may be applied to said telescoping strut;
   a first spring bearing surface engaging said first telescoping member;
   a second spring bearing surface engaging said second telescoping member;
   said negative preload spring being positioned between said first and second spring bearing surfaces;
   wherein said second telescoping member comprises a rod extending into said first telescoping member and said second spring bearing surface engages said rod, so that said negative preload spring tends to bias said rod further into said first telescoping member;
   wherein said second spring bearing surface is adjustable so that said compressive preload force may be adjusted;
   said second spring bearing surface comprises a removable fastener; and
   said rod has an outer surface with a plurality of grooves thereon, said grooves being configured to secure said removable fastener to said piston rod;
   whereby said compressive preload force applied to said telescoping strut by said negative preload spring may be adjusted by seating said removable fastener in one of said grooves.

2. The suspension system of claim 1, wherein said negative preload spring comprises a coil spring.

3. A suspension system, comprising:
   a telescoping strut comprising a first telescoping member having a first end and a second end, and a second telescoping member, said first and second telescoping members being telescopingly and coaxially engaged with each other, said telescoping strut being compressible by relative movement of said first and second telescoping members toward each other, and being expandable by relative movement of said first and second telescoping members away from each other;
   a piston slidably positioned within said first telescoping member;
   a gas spring having a spring rate and being positioned within said first telescoping member between said piston and said first end of said first telescoping member;
   a piston location adjuster interconnected with said piston for adjusting said piston from a first position relative to said first telescoping member to a second position relative to said first telescoping member, whereby said spring rate of said gas spring may be adjusted;
   a piston rod attached to said second telescoping member, and wherein said piston location adjuster comprises:
      said piston being interconnected with said second telescoping member and having a threaded portion;
      said piston rod having a threaded portion, said piston and piston rod being threadably connected at said threaded portions of said piston and said piston rod;
      whereby rotation of said piston relative to said piston rod moves said piston from said first position to said second position;
   wherein an adjuster knob is rotatably externally mounted on said telescoping strut proximal to said first end of said first telescoping member;
   said adjuster knob is interconnected with said piston so that rotation of said adjuster knob moves said piston from said first position to said second position;
   wherein said piston comprises an interface portion having an inner surface and an outer surface, said interface portion being disposed between said adjuster knob and said piston;
   an adjuster rod slidably extends into said inner surface of said interface portion;
   said adjuster rod is interconnected with said adjuster knob for rotation therewith, and said adjuster rod and said inner surface of said interface portion are configured for rotatable engagement; and
   said outer surface of said interface portion is configured for threaded engagement with said adjuster body, whereby rotation of said adjuster knob results in rotation of said adjuster rod, said interface portion and said piston, and moves said piston from said first position to said second position.

4. The suspension system of claim 3, wherein said adjuster knob has a valve therein, and said adjuster rod has a passage extending therethrough such that said gas spring may be externally pressurized or depressurized.

5. A suspension system, comprising:
   a telescoping strut comprising a first telescoping member having a first end and a second end, and a second telescoping member, said first and second telescoping members being telescopingly and coaxially engaged with each other, said telescoping strut being compressible by relative movement of said first and second telescoping members toward each other, and being expandable by relative movement of said first and second telescoping members away from each other;

a piston slidably positioned within said first telescoping member;

a gas spring having a spring rate and being positioned within said first telescoping member between said piston and said first end of said first telescoping member;

a piston location adjuster interconnected with said piston for adjusting said piston from a first position relative to said first telescoping member to a second position relative to said first telescoping member, whereby said spring rate of said gas spring may be adjusted; and a piston rod attached to said second telescoping member, and wherein said piston location adjuster comprises:
said piston having a threaded portion and said piston rod having a threaded portion, said piston and said piston rod being threadably connected at said threaded portions;
whereby rotation of said piston moves said piston from said first position relative to said first telescoping member to said second position relative to said first telescoping member.

6. A bicycle suspension fork, comprising:

a first telescoping strut comprising a first telescoping member and a second telescoping member, said first and second telescoping members being telescopingly and coaxially engaged with each other, said first telescoping strut being compressible by relative movement of said first and second telescoping members toward each other, and being expandable by relative movement of said first and second telescoping members away from each other;

a piston interconnected with said second telescoping member and being slidably positioned within said first telescoping member;

a first gas chamber containing a gas and a second gas chamber containing a gas, said first and second gas chambers being separated by said piston; and at least one port extending from said first gas chamber to said second gas chamber;

whereby relative movement between said first and second telescoping members causes relative movement between said piston and said first telescoping member and a flow of said gas between said first and second gas chambers through said at least one port, said flow of said gas through said at least one port creating a damping force to resist relative movement between said first and second telescoping members;

wherein said piston is attached to a hollow piston rod which is attached to said second telescoping member, and second gas chamber is defined within said hollow piston rod.

7. The bicycle suspension fork of claim 6, further comprising a safety mechanism for preventing hazardous decompression of said first and second gas, chambers during assembly or disassembly of said suspension system.

8. A bicycle suspension fork, comprising:

a first telescoping strut comprising a first telescoping member and a second telescoping member, said first and second telescoping members being telescopingly and coaxially engaged with each other, said first telescoping strut being compressible by relative movement of said first and second telescoping members toward each other, and being expandable by relative movement of said first and second telescoping members away from each other;

a piston interconnected with said second telescoping member and being slidably positioned within said first telescoping member;

a first gas chamber containing a gas and a second gas chamber containing a gas, said first and second gas chambers being separated by said piston;

at least one port extending from said first gas chamber to said second gas chamber;

whereby relative movement between said first and second telescoping members causes relative movement between said piston and said first telescoping member and a flow of said gas between said first and second gas chambers through said at least one port, said flow of said gas through said at least one port creating a damping force to resist relative movement between said first and second telescoping members; and a piston location adjuster interconnected with said piston for adjusting said piston from a first position relative to said first telescoping member to at least one second position relative to said first telescoping member.

* * * * *